Dec. 1, 1953
H. EISNER
2,661,042
REMOVABLE ANTISKID DEVICE FOR VEHICLE
WHEELS PROVIDED WITH RESILIENT TIRES
Filed March 11, 1950
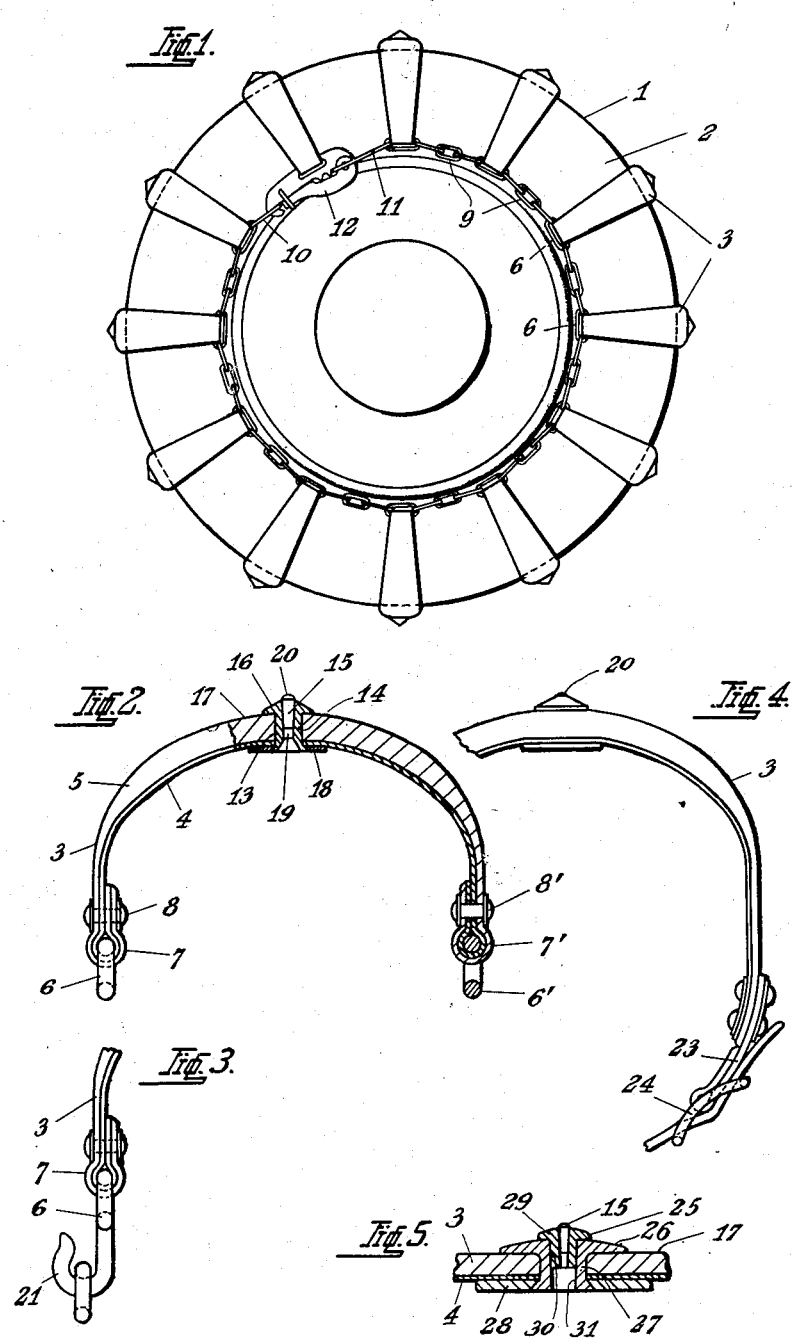
INVENTOR:
HAROLD EISNER Patented Dec. 1, 1953

2,661,042

UNITED STATES PATENT OFFICE 2,661,042

REMOVABLE ANTISKID DEVICE FOR VEHICLE WHEELS PROVIDED WITH RESILIENT TIRES

Harold Eisner, Prangins, Switzerland

Application March 11, 1950, Serial No. 149,054

Claims priority, application Switzerland June 8, 1949

1 Claim. (Cl. 152—222)

This invention relates to a removable anti-skid device for vehicle wheels provided with resilient tires and more particularly for motor vehicles in which at least an anti-skid member consisting at least partly of hard sintered metal composition is inserted in a plate which lies in the position of use on the tread surface of the tire.

The object of the invention is to make use of the infallible gripping and non-skidding effect of such hard metal composition on slippery ground, such as sleet, in an anti-skid device, which will avoid the drawbacks of the hitherto known metallic anti-skid devices, such as for example, the usual snow chains of wrought iron or steel. The properties aimed at to attain consist more particularly in this that the anti-skid device shall cling well on the pneumatic tire and protect its surface. The disadvantages of great weight experienced in connection with the usual snow chains as well as the rapid wear of the chain links which come into contact with the road bed are avoided by the fact that the chain links, if they are still provided, are used for the mounting of the anti-skid device only where they do not touch the road bed. Moreover, the properties of the pneumatic tire are imparted to the anti-skid device such as pressure-elasticity and durability, as well as a constitution which renders them equal to the special snow profiled pneumatic tires with their good gripping effect in deep snow, being, however, superior to them by their ensuring at the same time infallible gripping effect on smooth ice.

The invention consists of a non-metallic pressure-resilient flexible band which is placed in the position of use, transversely over the tread surface of the tire, the plate being secured thereon in such a manner that the anti-skid member consisting at least partly of the aforesaid hard metal composition projects outwardly over the tread surface of the band.

The accompanying drawing illustrates by way of example one embodiment of the invention.

Figure 1 is a side elevation of an anti-skid device mounted on a vehicle wheel and consisting of a number of bands carrying anti-skid members.

Figure 2 shows one of these bands partly in longitudinal section.

Figure 3 is a detail.

Figure 4 shows a single band suitable for mounting and

Figure 5 shows a modification of the fixing of the anti-skid member on to the band.

The band 3, which is placed in the position of use transversely over the tread surface 1 of the wheel tire 2 consists of a linen backing 4 with a rubber layer 5 vulcanised thereon and is of approximately rectangular cross section, so that in the position of use (see Figure 1) it shows step-like heels on the tread surface 1 of the tire. The longitudinal ends of the band 3 are fixed in position by a chain link 6, 6', bent into a loop 7, 7' and closed by means of rivets 8, 8'. The chain link 6, together with other chain links 6, are inserted at equal distances from one another in links 9 along adjacent bands 3 to form a chain 9, the ends 10 and 11 of which are connected together by means of a tension clasp 12 in order that it may, together with the chain on the other side of the tire connecting together the other loops 7', hold the bands 3 firmly onto the tire 2.

The anti-skid member consisting of a shell 14 and a hard metal pin 15 is inserted in a bore 13 on the part of the band 3 lying on the tread surface of the tire, and lies with the wart-like enlarged outer end 16 of the shell 14 on the tread surface 17 of the band 3, the inner end of the shell 14 being riveted in an annular supporting plate 18 lying against the linen backing 4 of the band 3 so that both the plate and the anti-skid member lie firmly on the band. Their edges, which are in contact with the band, are rounded off. The outer diameter of the supporting plate 18 is greater than that of the outer end 16 of the shell 14.

The pin 15, which is preferably of sintered hard metal composition, for instance, one of tungsten-carbide base with a hardness of approximately 68 Rockwell C (load 150 kg.) corresponding to 88 to 90 Rockwell A (load 60 kg.) is inserted into the middle of the shell 14, which is provided with a conical bore 19 to receive the conical pin 15 in such a manner that the whole of the peripheral surface of the pin lies in the shell 14 and projects outwards therefrom only with its rounded end surface 20, so as to form a meniscus of great resistance to wear.

More than one anti-skid member may be secured in the manner hereinbefore described inside the tread surface of the band. The tread surface of the band may be smooth at the point not covered by the anti-slide members or be provided with a profile similar to those of vehicle tires. In order to facilitate replacement of the individual bands, the chain links 6, 6', closed in the loops 7 of the bands 3 may be provided each with a hook 21 (Figure 3), by means of which they can be hung into a chain serving as an assembling member.

As shown in Figure 4, the bands 3 may also be individually provided with assembling means, for instance leather belts 22, 23 and connecting buckles 24 riveted onto the longitudinal ends of the band 3. Such bands can be easily and readily mounted onto suitable wheels, as for instance spoked wheels instead of the anti-skid chains, if necessary.

According to Figure 5, the plate 26 supporting the anti-skid member or shell 25 may be arranged on the tread surface 17 of the band 3 and be riveted onto the annular plate 28 lying against the linen backing 4 of the band, by means of a neck 27 constructed in the form of a hollow rivet so that it lies firmly on the band 3. The shell 25 into which the aforesaid hard metal pin 15 is inserted forms a conical plug 30 on a short wart-like rounded head 29, by means of which it is inserted in a removable manner into the conical bore 31 of the neck 27.

Instead of the chain links 6, 6' a cable may be inserted through the loops 7, 7' of a plurality of bands 3 connected together to form an anti-skid attachment, the said cable serving as an assembling member instead of a chain.

What I claim and wish to secure by Letters Patent is:

An anti-skid device for application to a vehicle wheel equipped with a rubber tire having a tread surface; comprising a non-metallic, pressure resilient flexible band having an under surface adapted to extend on and across the tread surface of said tire, a metallic and rounded anti-skid projection extending beyond the tread surface of said band, said projection including a shank having a central conical bore and passing through said band, an annular flange plate connected to said shank and riveted at said under surface of said band, said plate being substantially larger in diameter than that of said projection, and a pin consisting of sintered hard metal composition wedged into said central conical bore and extending beyond said projection a predetermined distance, said pin terminating at one end in a rounded outer frontal surface depending toward said projection, the remainder of said pin being in contact with the wall defining said bore and terminating with its other end short of the end of said bore adjacent said plate, said other end of said pin extending approximately half the height of said hollow shank of said projection.

HAROLD EISNER.

References Cited in the file of this patent

UNITED STATES PATENTS

| Number | Name | Date |
|---|---|---|
| 2,469,666 | Raz-Ammann | May 10, 1949 |
| 2,473,249 | Hershman | June 14, 1949 |

FOREIGN PATENTS

| Number | Country | Date |
|---|---|---|
| 12,781 | Great Britain | 1906 |
| 355,660 | France | Nov. 9, 1905 |
| 376,619 | France | Aug. 14, 1907 |
| 389,735 | France | Sept. 16, 1908 |
| 407,196 | France | Feb. 21, 1910 |